United States Patent [19]

Ridgway et al.

[11] Patent Number: 5,015,052
[45] Date of Patent: May 14, 1991

[54] OPTICAL MODULATION AT MILLIMETER-WAVE FREQUENCIES

[75] Inventors: Richard W. Ridgway, Westerville; Milton R. Seiler, Worthington; Van E. Wood, Delaware; George T. Ruck, Worthington, all of Ohio

[73] Assignee: Battelle Memorial Institute, Columbus, Ohio

[21] Appl. No.: 383,399

[22] Filed: Jul. 20, 1989

[51] Int. Cl.$^5$ .............................................. G02B 6/10
[52] U.S. Cl. .................. 350/96.13; 350/96.14
[58] Field of Search ............. 350/96.12, 96.13, 96.14, 350/96.15

[56] References Cited

U.S. PATENT DOCUMENTS

| | | | |
|---|---|---|---|
| 3,874,782 | 4/1975 | Schmidt | 350/96.13 |
| 4,124,270 | 11/1978 | Cheo | 350/96.12 |
| 4,208,091 | 6/1980 | Cheo et al. | 350/96.13 |
| 4,575,179 | 3/1986 | Lee et al. | 350/96.13 |
| 4,685,988 | 8/1987 | Wagner et al. | 350/96.14 X |
| 4,693,549 | 9/1987 | Cheo | 350/96.14 |
| 4,707,060 | 11/1987 | Cheo et al. | 350/96.14 |
| 4,722,583 | 2/1988 | Stewart | 350/96.13 X |
| 4,770,483 | 9/1988 | Ridgway | 350/96.14 |
| 4,859,059 | 8/1989 | Bobb et al. | 350/96.13 X |

Primary Examiner—William L. Sikes
Assistant Examiner—Phan T. Heartney
Attorney, Agent, or Firm—Philip M. Dunson

[57] ABSTRACT

Apparatus for modulation of optical signals at millimeter-wave frequencies comprises a thin elongate dielectric slab (1) of lithium niobate to partially confine and guide therein a polarized electrical signal (8) at millimeter-wave frequencies; a thinner optical waveguide (3) of lithium niobate with titanium diffused therein to substantially confine and guide therein an optical signal (9), having at least one elongate surface adjacent to an elongate surface of the dielectric slab (1); an optical grating (5) of arsenic trisulfide for directing a polarized optical signal (9) into the waveguide (3) to propagate in a lengthwise direction therein; an optical grating (7) of arsenic trisulfide for directing the optical signal (9) out of the waveguide (3) after it has traversed a predetermined distance therein; and a metallic waveguide (2) for directing an electrical signal (8) into the dielectric slab (1) in the same direction as that of the optical signal (9) in the waveguide (3), and at a center frequency such that it propagates at a phase velocity substantially matching the phase velocity of the optical signal (9).

17 Claims, 2 Drawing Sheets

# OPTICAL MODULATION AT MILLIMETER-WAVE FREQUENCIES

FIELD

This invention relates to apparatus for modulation of optical signals at millimeter-wave frequencies. It has to do mainly with copropagation of electrical signals and optical signals in dielectric waveguides at substantially matching phase velocities for efficient electrooptic modulation.

BACKGROUND

The modulation of optical signals at microwave and millimeter-wave frequencies is of much interest for fiber-optic communications and other optical signal processing. The electrooptic effect, which induces an electric-field dependent change in refractive index, is known to operate at frequencies well in excess of 100 gigahertz. The change in refractive index can induce phase shifts in optical signals, and in appropriate configurations can also modulate the intensity, frequency, or polarization state of optical signals. However, it is hard to achieve the amount of overlap of the microwave signal and the optical signal that is required for efficient electrooptic interaction.

The usual technique for achieving a strong electrooptic overlap is to apply the microwave signal to metallic conductors in proximity to an optical waveguide fabricated in an electrooptic material, such as lithium niobate. The microwave signal induces an electric field within the optical waveguide causing a change in the refractive index, which changes the optical wave propagation.

It is difficult to achieve the proper microwave impedance with the metallic conductors. Moreover, the DC resistance associated with the thin metal structure causes severe restrictions on the high frequency operation. There is also a large velocity mismatch between the electrical signal propagating on the metallic electrode and the optical signal propagating in the optical waveguide. This mismatch limits the interaction length over which the optical signal accumulates the electrooptically induced phase shift.

To overcome the velocity mismatch several methods of "artificial velocity matching" have been proposed such as "phase reversed electrodes" and "intermittent interaction electrodes". These methods, which rely on special design of the metallic stripline, present increasing fabrication problems as the wavelength of the electrical signal is reduced for operation at millimeter wavelengths.[1]

The above limitations are absent in the present invention, which does not require metallic striplines. The high-frequency electrical signal is propagated in a dielectric waveguide collinearly with the optical signal at substantially matching phase velocities.[2]

DRAWINGS

CARRYING OUT THE INVENTION

Figure 1:
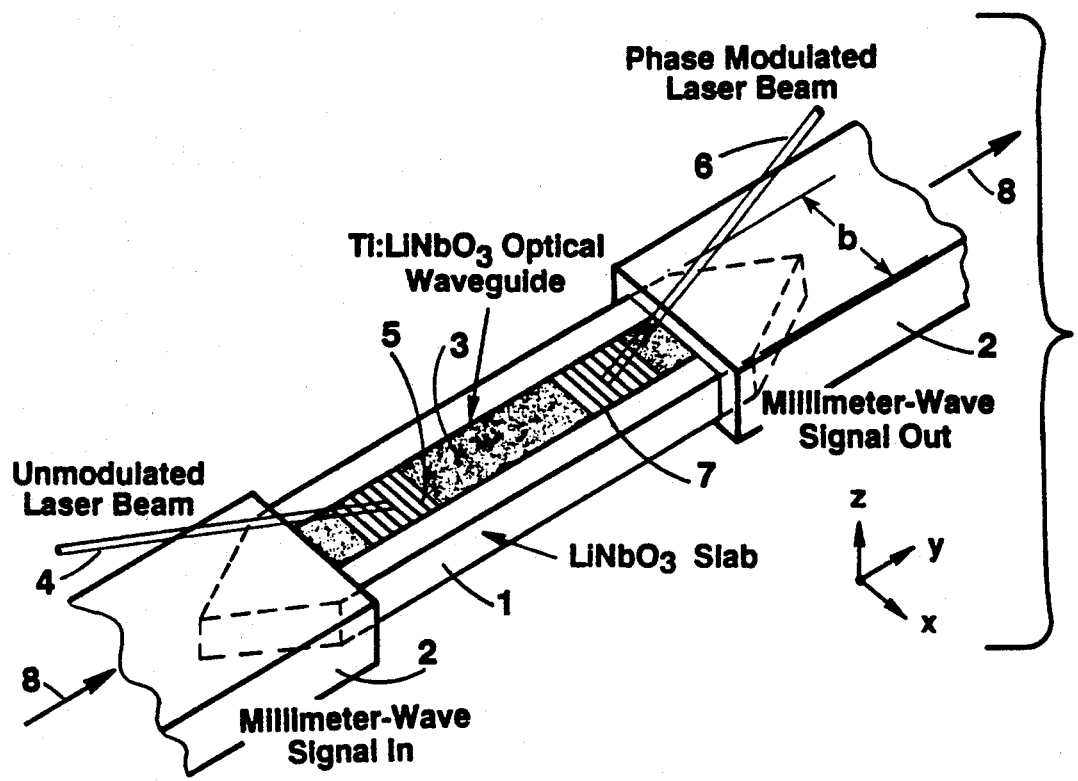
FIG. 1 is a schematic perspective view of a typical optical modulator according to the present invention having an optical waveguide on one surface of a dielectric slab.
Figure 2:
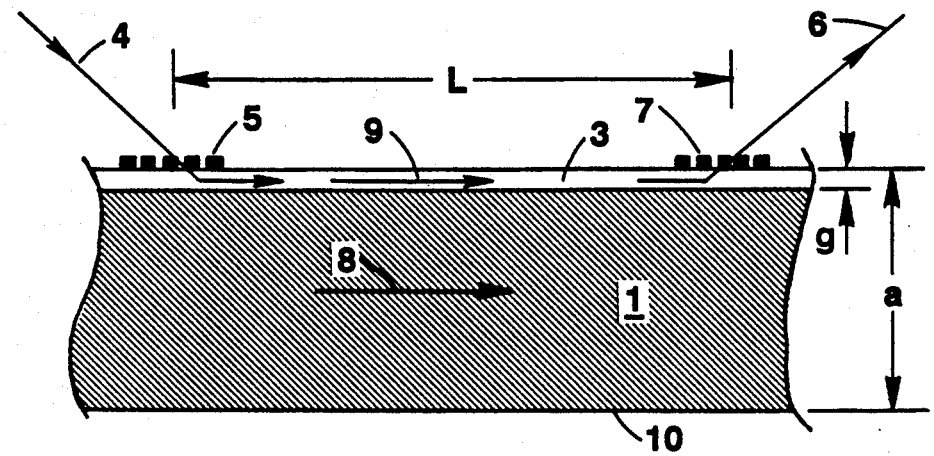
FIG. 2 is a schematic longitudinal sectional view of a portion of the optical modulator shown in FIG. 1.

As shown in FIGS. 1 and 2, typical apparatus according to the present invention comprises a thin dielectric slab 1. The slightly tapered ends of the slab are inserted into metallic millimeter waveguides 2. One surface of the dielectric contains a thin optical waveguide 3. While the waveguide is indicated on the figures as a uniform thin layer, it may be an inhomogeneous layer such as may be formed by a process of diffusion or ion exchange. An unmodulated laser beam 4 is directed into the optical waveguide 3 by an input grating 5 and the modulated laser beam 6 is directed out of the optical waveguide 3 by an output grating 7 that is spaced a distance L, in the lengthwise direction, from the input grating 5.

With reference to FIG. 2, an electrooptically induced phase shift in the optical signal 9 occurs over the interaction length L from the overlapping electric field of the electrical signal 8 copropagated in the dielectric 1 in the lengthwise, Y, direction.

The phase velocity of the electrical signal 8 and that of the optical signal 9 are substantially matched by design of the optical modulator with the appropriate thickness, a, of the dielectric slab 1 for the nominal millimeter-wave frequency selected and the dielectric material used.

A typical dielectric material to use in fabrication of apparatus according to this invention is lithium niobate, $LiNbO_3$, which is optically transparent, is available in large sizes, has large electrooptic coefficients, and can be configured into low-loss waveguides for propagation of electromagnetic signals in both the millimeter wave and the visible spectral regions.

In one typical embodiment of this invention, as shown in FIGS. 1 and 2, a thin optical waveguide 3 is formed on one surface of the dielectric slab 1 by indiffusion of titanium to form a thin layer.

($Ti:LiNbO_3$) of higher index of refraction than the bulk dielectric slab 1 using well-known techniques. The optical waveguide thickness, g, is typically made very small (e.g. about 0.5 to 3 micrometer for visible wavelengths) for the preferred single-mode propagation of the optical signal.

The width b, of the dielectric 1 is typically about 1 millimeter. The width of the optical waveguide can be equal to the width of the dielectric slab or less as shown in FIG. 1.

Two important parameters that need to be considered when designing an optical modulator for use in this invention are the polarization of the optical signal and the polarization of the millimeter-wave modulating signal since these polarizations determine the magnitude of the electrooptic interaction. The choice of transverse electric, TE, or transverse magnetic TM, optical polarization and the choice of TE or TM millimeter-wave polarization depend primarily on the choice of electrooptic material. Lithium niobate is a typical electrooptic material selected to describe the invention herein with quantitative examples of modulation effectiveness.

Other dielectric materials such as strontium barium niobate, might be used that would provide larger electrooptic coefficients and consequently larger electrooptic interactions. One configuration that allows efficient electrooptic interaction in lithium niobate is TM polarized light and TM polarized millimeter waves in z-cut lithium niobate. Other materials, crystal cuts, and polarizations can be used. Some provide equivalent electrooptic interactions; still others provide decreased electrooptic interaction.

The most efficient electrooptic modulation of the phase of the optical signal is achieved when the phase velocity of the electrical signal 8 matches the phase velocity of the optical signal 9. This velocity matching can be achieved by appropriate selection of the dielectric slab thickness, a, for the particular dielectric material and frequency of the electric signal.

The relationship of phase velocity, $v_{mmw}$, of the electrical signal 8 to the thickness, a, of the dielectric slab 1 can be derived from theoretical considerations of propagation of electromagnetic waves in dielectrics.

With reference to the coordinate system in FIG. 1, the dielectric waveguide 1 is assumed to be a planar waveguide, unbounded in the xy plane. Transverse magnetic, TM, modes in the slab of dielectric material have a magnetic field along x, which is related by Maxwell's equations to an electric field having y and z components. The TM modes with a symmetric z component of the electric field have a transverse H field of the form $$H_x = A\cos(k_z z)e^{-j\beta y} \quad |z| \leq a/2 \quad (1)$$
$$= Be^{-\alpha_z z}e^{-j\beta y} \quad z > a/2$$
$$= Be^{\alpha_z z}e^{-j\beta y} \quad z < -a/2$$

where A and B are constants representing the magnitudes of the magnetic fields inside and outside of the waveguide, respectively; $\beta$ is the propagation constant of the waveguide; a is the thickness of the dielectric slab; and $k_z$ and $\alpha_z$ are variables describing the magnetic fields inside and outside of the waveguide, respectively. The electric field follows from Ampere's law. The z component is given by $$E_z = \frac{A\beta}{\omega\epsilon_z} \cos(k_z z)e^{-j\beta y} \quad |z| \leq a/2 \quad (2)$$
$$= \frac{B\beta}{\omega\epsilon_o} e^{-\alpha_z z}e^{-j\beta y} \quad z > a/2$$
$$= \frac{B\beta}{\omega\epsilon_o} e^{\alpha_z z}e^{-j\beta y} \quad z < -a/2.$$

where $\omega$ is the radial frequency, $\epsilon_o$ is the permittivity of free space, and $\epsilon_z$ is the extraordinary permittivity of the anisotropic dielectric material.[3] The y component of the electric field is given by $$E_y = \frac{Ak_z}{j\omega\epsilon_y} \sin(k_z z)e^{-j\beta y} \quad |z| \leq a/2 \quad (3)$$
$$= \frac{-B\alpha_z}{j\omega\epsilon_o} e^{-\alpha_z z}e^{-j\beta y} \quad z < a/2$$
$$= \frac{B\alpha_z}{j\omega\epsilon_o} e^{\alpha_z z}e^{-j\beta y} \quad z < -a/2.$$

where $\epsilon_y$ is the ordinary permittivity of the anisotropic dielectric material.

Continuity for $E_y$ and $H_x$ at the dielectric boundaries ($z = \pm a/2$) is obtained when $$\tan(k_z a/2) = \frac{\epsilon_y}{\epsilon_o} \frac{\alpha_z}{k_z}. \quad (4)$$

There are three unknowns in this equation $k_z$, a, and $\alpha_z$. We can use Faraday's law to eliminate one unknown We can show further that inside the waveguide $$k_z^2 = \omega^2 \epsilon_y \mu_o - \frac{\epsilon_y}{\epsilon_z} \beta^2 \quad (5)$$

where $\mu_o$ is permeability of free space. We can show also that outside the waveguide $$\alpha_z^2 = \beta^2 - \psi^2 \epsilon_o \mu_o. \quad (6)$$

Substituting (5) and (6) into (4) results in the expression $$\tan(k_z a/2) = \frac{\epsilon_y}{\epsilon_o} \sqrt{\frac{\frac{\epsilon_z}{\epsilon_y}(\omega^2\epsilon_y\mu_o - k_z^2) - \omega^2\epsilon_o\mu_o}{k_z^2}}. \quad (7)$$

Now there are two unknowns, $k_z$ and a, and the equation can be solved.

Rewriting (7) gives an expression for a in terms of $k_z$ $$a = \frac{2}{k_z}\tan^{-1}\left[\frac{\epsilon_y}{\epsilon_o}\sqrt{\frac{\frac{\epsilon_z}{\epsilon_y}(\omega^2\epsilon_y\mu_o - k_z^2) - \omega^2\epsilon_o\mu_o}{k_z^2}}\right]. \quad (8)$$

We can select various $k_z$, find the corresponding waveguide thickness, a, using (8), and then use (5) to determine the propagation constant $\beta$ of the waveguide. The phase velocity in the waveguide is given by $$v_{mmw} = \frac{\omega}{\beta}. \quad (9)$$

Figure 3:
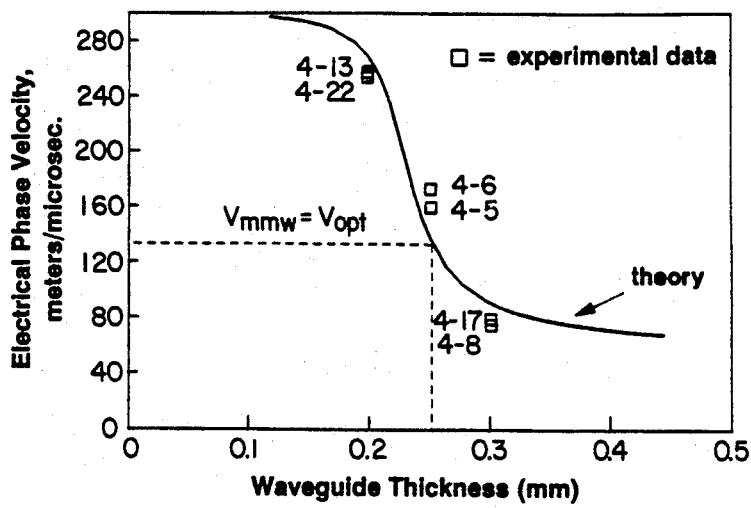
FIG. 3 is a graph of phase velocity of the electrical signal as a function of slab thickness, showing the theoretical curve and experimental data.
Figure 4:
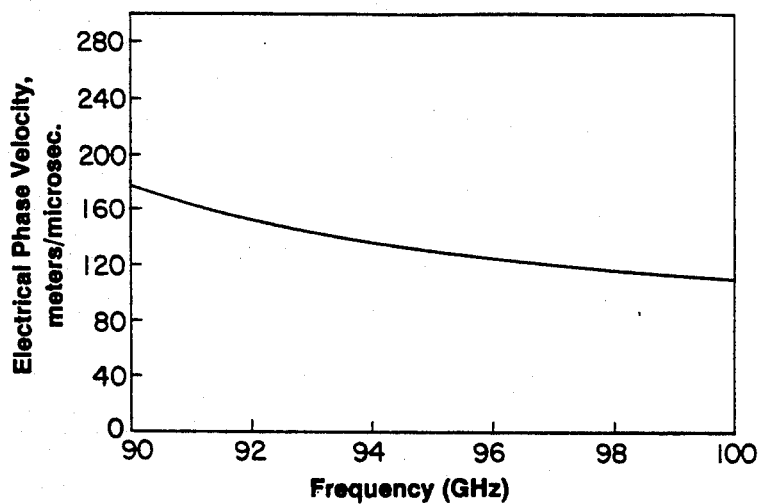
FIG. 4 is a graph of phase velocity of the electrical signal as a function of frequency.

The theoretical curve of phase velocity of the millimeter-wave signal at 94 gigahertz as a function of dielectric waveguide thickness is shown in FIG. 3 for the values summarized in Table 1. The measured values of the relative permittivity (in the literature sometimes called relative dielectric constant) for lithium niobate at 94 gigahertz are $\epsilon_{zr} = 27$ for the extraordinary polarization, and $\epsilon_{xr} = \epsilon_{yr} = 45$ for the ordinary polarization.[4] Curve shapes are similar at other millimeter-wave frequencies. FIG. 4 shows the variation of phase velocity, $v_{mmw}$, with frequency, f, for a specific thickness of 0.25 millimeter for the dielectric waveguide.

TABLE 1

| Dielectric Material | z-cut Lithium Niobate |
|---|---|
| Relative Extraordinary Permittivity, $\epsilon_{zr}$ | 27 |
| Relative Ordinary Permittivity, $\epsilon_{yr}$ | 45 |
| Operating Frequency, f | 94 gigahertz |
| Polarization of | Transverse Magnetic, TM |

TABLE 1-continued

| | |
|---|---|
| Electrical Signal Permittivity of Free Space, $\epsilon_o$ | $8.85 \times 10^{-12}$ Fm$^{-1}$ |

The important consideration in FIG. 3 is that there is a design thickness, a, of the dielectric waveguide 1 at which the phase velocity of the dielectric signal 9 matches the phase velocity of the optical signal 8 (i.e. $v_{opt} = v_{mmw}$). For lithium niobate which has an extraordinary index of refraction of $n_e \approx 2.2$ at a wavelength of 633 nanometers, the phase velocity $v_{opt}$, of the optical signal 8 in the optical waveguide 3 is $1.36 \times 10^8$ m/sec (i.e. $v_{opt} = c/n$). As summarized in Table 2 and shown in FIG. 3, the matching velocity ($v_{mmw} = v_{opt}$) occurs at a thickness of the dielectric waveguide of a=0.25 millimeter.

TABLE 2

| | |
|---|---|
| Optical Waveguide Thickness, g | <0.5 micrometer |
| Optical Operating Wavelength, $\lambda_{opt}$ | 633 nanometers |
| Index of Refraction, $n_e$ | 2.2 |
| Optical Wave Phase Velocity, $v_{opt}$ | $1.36 \times 10^8$ m/sec |
| Matching Millimeter Wave Velocity, $v_{mmw}$ | $1.36 \times 10^8$ m/sec |
| Dielectric Slab Thickness, a | 0.25 millimeter |
| Propagation Constant, $\beta$ | 4343 m$^{-1}$ |

The magnitude of the electrooptic modulation of the optical signal depends on the electric field of the millimeter-wave signal 9 that overlaps the optical signal 8 at the location of the optical waveguide 3. The variation of the electric field inside and outside the dielectric slab 1 in the direction z can be derived from electromagnetic theory.

The electric fields for the millimeter-wave signal are described in Equations (2) and (3). Equations (8) and (5) can be used to solve for $k_z$ and $\beta$ as a function of waveguide thickness a. The two remaining unknowns in Equations (2) and (3) are the constants A and B, both of which have units of amperes/meter. The relationship between A and B is determined by the boundary conditions $$B = A \cos(k_z a/2) e^{\alpha z a/2}. \tag{10}$$

The input power level, P, determines the magnitudes of A and B.

$$P = \tfrac{1}{2} \int_{-\infty}^{\infty} \int_{-\infty}^{\infty} E_z H_x^* dz dx, \text{ watts.} \tag{11}$$

If we assume that the width, b, of the waveguide is large relative to a, and has little effect on the mode structure; then $E_z$ and $H_x$ do not depend on x; and the integration over x can be taken separately. Further, since the mode is symmetric, we can integrate over z from 0 to $\infty$, so that $$P = \tfrac{1}{2} \int_{-b/2}^{b/2} dx\, 2 \int_0^\infty E_z H_x^* dz, \text{ watts,} \tag{12}$$

where b is the waveguide width. Evaluating the integral results in the expression $$P = \frac{A^2 \beta b}{4\omega \epsilon_z}\left(a + \frac{1}{k_z}\sin(k_z a)\right) + \frac{b\beta B^2}{2\alpha_z \omega \epsilon_o} e^{-\alpha_z a}. \tag{13}$$

Given the material and dimensions, a and b, of the waveguide along with the millimeter-wave power P, into the waveguide, we can obtain values for the constants A and B.

For a slab width of b=1 millimeter and a millimeter-wave signal power of P=100 microwatts, the maximum electric field at the center of the slab is 6100 volts per meter, and at the surface of the slab is 460 volts per meter as summarized in Table 3. The distribution of the electric field, $E_z$, is shown in FIG. 4 as a function of position along the z dimension from the center plane of the dielectric slab.

TABLE 3

| | |
|---|---|
| Slab Width, b | 1 millimeter |
| Slab Thickness, a | 0.25 millimeter |
| Power, P | 100 milliwatts |
| Constant A | 140 amperes/meter |
| Constant B | 16 amperes/meter |
| Electric Field at Center | 6100 volts/meter |
| Electric Field at Surface | 460 volts/meter |

The z component of the millimeter wave drive signal propagating in the y direction in the dielectric waveguide is given by $$E_z(y,t) = E_{zo} \sin(\beta y - \omega t) \tag{14}$$

where $E_{zo}$ is the magnitude of the millimeter-wave electric field in the optical waveguide. $\beta$ is the propagation constant of the millimeter wave in waveguide, and $\omega$ is the radial frequency. The electric field seen at a position y (0<y<L) along the interaction length L of the optical waveguide 3 by photons that enter the interaction region (y=0) at time t=$t_o$ is given by $$E_z(y,t_o) = E_{zo}\sin\left[\beta\left(1 - \frac{v_{mmw}}{v_{opt}}\right)y - \omega t_o\right] \tag{15}$$

where $v_{mmw}$ and $v_{opt}$ are the phase velocity of the electric signal 8 and optical signal 9 respectively.

However, if the electrical field and optical field are propagating at the same phase velocity ($v_{mmw} = v_{opt}$) Equation (15) reduces to $$E_z(t_o) = E_{zo}\sin \omega t_o. \tag{16}$$

A given photon sees a constant electric field, and therefore a constant refractive index, n, as it propagates down the optical waveguide through the interaction length, L. A photon entering the waveguide a little later sees a different electric field and a different electrooptically induced refractive index. However, the electric field and the induced refractive index appear to remain constant for a photon that travels at the same velocity as the electric field.

The millimeter-wave signal 8 induces a maximum change in refractive index, $\Delta n$, in the optical waveguide 3 given by $$\Delta n = \tfrac{1}{2} n_e^3 r_{33} E_{zo}. \tag{17}$$

The total electrooptically induced phase shift, $\Delta\phi$, of the optical signal 9 of wavelength $\lambda_{opt}$ over an interaction length, L, is given by $$\Delta\phi = \frac{2\pi L \Delta n}{\lambda_{opt}}. \tag{18}$$

Thus, for the specific example previously defined by Tables 1 through 3 with an electric field of magnitude $E_{zo}=460$ volts per meter, an assumed optical wavelength of $\lambda_{opt}=633$ nanometers, and an interaction length of 50 millimeters, the optical phase shift is $\Delta\phi=28$ milliradians, as summarized in Table 4.

TABLE 4

| Polarization of Optical Signal | TM |
|---|---|
| Electrooptic Coefficient, $r_{33}$ | $30.8 \times 10^{-12}$ meter/volt |
| Optical Wavelength, $\lambda_{opt}$ | 633 nanometers |
| Interaction Length, L | 50 millimeters |
| Optical Phase Shift, $\Delta\phi$ | 28 milliradians |

The above example indicates typical conditions in which an optical modulator provides a detectable phase shift. A microwave signal of nominal frequency 94 gigahertz can be matched in phase velocity to the optical signal by making the dielectric waveguide thickness about 0.25 millimeter. This nominal frequency or center frequency can be defined as the frequency at which the phase velocity of the electrical signal $v_{mmw}$ and the phase velocity of the optical signal $v_{opt}$ are equal.

For most practical applications, it is desirable to operate in a frequency band around the center frequency. Operation at frequencies above or below 94 gigahertz affects the phase velocity of the microwave signal as shown by Equation (9) and FIG. 4. For operation at other than the design center millimeter-wave frequency, the two velocities microwave signal $v_{mmw}$ relative to the velocity of the optical signal $v_{opt}$ results in some attenuation of the phase shift $\Delta\phi$ as shown by Equation (15). A useful bandwidth can be determined from the following theoretical considerations and assumptions regarding the allowable attenuation.

The effective electric field as a function of position is given by Equation (15). The millimeter-wave signal induces a change in refractive index given by $$\Delta n(y,t) = \tfrac{1}{2} n_e^3 r_{33} E_z(y,t). \tag{19}$$

If the optical and millimeter-wave signals interact over a length, L, the total electrooptically induced phase shift is given by $$\Delta\phi(t_o) = \frac{2\pi L \overline{\Delta n}(t_o)}{\lambda_{opt}} \tag{20}$$

where $\lambda_{opt}$ is the free space optical wavelength, and $\Delta n(t_o)$ is the average electrooptically induced change in refractive index and is given by $$\overline{\Delta n}(t_o) = \frac{1}{L} \int_{\phi}^{L} \Delta n(y,t_o)dy. \tag{21}$$

The accumulated electrooptically induced phase shift is then given by $$\Delta\phi(t_o) = \tag{22}$$

$$\frac{\pi n_e^3 r_{33} E_{zo}}{\lambda_{opt}} \int_{\phi}^{L} \sin\left[\beta\left(1 - \frac{V_{mmw}}{V_{opt}}\right)y - \omega t_o\right]dy.$$

Evaluating the integral and applying some trigonometric identities yields $$\Delta\phi(t_o) = \frac{4\pi n_e^3 r_{33} E_{zo}}{\lambda\beta\left(1 - \frac{V_{mmw}}{V_{opt}}\right)} \sin\left(\tfrac{1}{2}\beta\left(1 - \frac{V_{mmw}}{V_{opt}}\right)L\right)\sin\left(\tfrac{1}{2}\beta\left(1 - \frac{V_{mmw}}{V_{opt}}\right)L + \omega t_o\right) \tag{23}$$

Equation (23) shows how a velocity mismatch between the optical and electrical signal results in amplitude and phase adjustment of the phase modulation. In other words, if the phase of an optical signal is sinusoidally modulated, any velocity mismatch reduces the magnitude of the phase modulation. If the velocity mismatch is too large, then the accumulated electrooptically induced phase shift goes to zero, because in some places along the waveguide the phase shift is positive and in some places the phase shift is negative. In general, the magnitude of the phase shift is reduced by $$\sin \xi / \xi$$

where $$\xi = \tfrac{1}{2}\beta\left(1 - \frac{V_{mmw}}{V_{opt}}\right)L.$$

We define a 3 decibel reduction in phase shift magnitude as occurring when $$\frac{\sin\xi}{\xi} = \frac{1}{\sqrt{2}} \tag{24}$$

Solving (24) yields $\xi \leq 1.4$, or $$\tfrac{1}{2}\beta\left|\left(1 - \frac{V_{mmw}}{V_{opt}}\right)\right|L \leq 1.4. \tag{25}$$

Solving (25) yields $$|V_{opt} - V_{mmw}| \leq \frac{2.8 V_{opt}}{L\beta}. \tag{26}$$

Since $v_{opt}$ remains relatively constant, (26) provides boundaries for $v_{mmw}$, which vary with slab dimensions and frequency. Once the velocity bounds are determined, the millimeter wave bandwidth can be determined from FIG. 4. As summarized in Table 5, for the prior example, a 3 decibel bandwidth of 520 megahertz is indicated.

TABLE 5

| | |
|---|---|
| Reduction of Phase Shift Magnitude Limit | 3 decibels |
| Velocity Mismatch Limit, $\|v_{opt} - v_{mmw}\|$ | $1.75 \times 10^6$ m/sec |
| Bandwidth (3 decibels) | 520 megahertz |

The optical phase shift $\Delta\phi$ can be made larger by increasing the interaction length, L. For a thin dielectric slab 1 with long interaction length L, physical support at the surface 10 can be provided by placing it on a solid flat supporting member comprising material such as a glass or polystyrene (not shown in FIGS. 1 and 2) that has a low dielectric constant ($\epsilon = 1.5-2$) compared to that of the dielectric slab 1 ($\epsilon = 2.2$).

Figure 5:
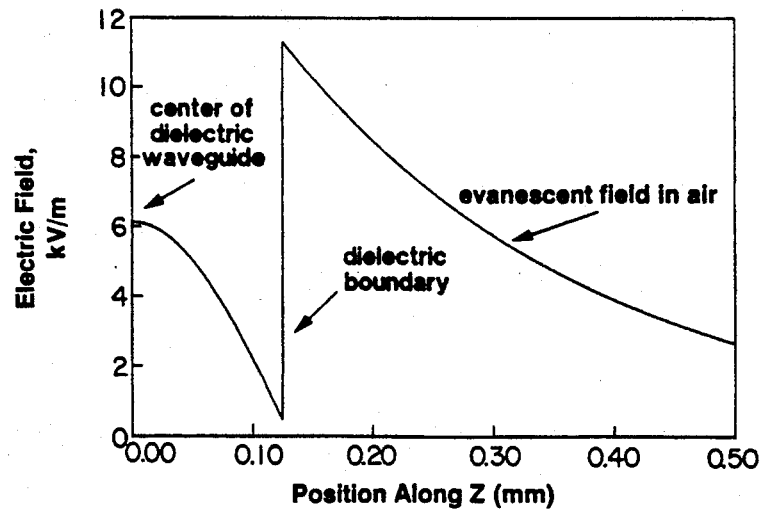
FIG. 5 is a graph of electric field in the dielectric slab as a function of position along the z direction (vertical) from the center of the dielectric slab.

The optical phase shift $\Delta\phi$ can be made larger by increasing the microwave power and/or by locating the optical waveguide 3 in a larger electric field. As shown in FIG. 5, the electric field at the center of the dielectric waveguide 1 is 6100 volts per meter compared to 460 volts per meter at the surface Another typical embodiment of this invention is that shown in FIG. 6. For exposure to maximum electric field, the optical waveguide 3' is located at the center of the dielectric 1', 1". Typically an optical fiber 11 directs the laser beam 4' into the optical waveguide 3', and another optical fiber 11' directs the modulated beam 6' out of the waveguide 3' at the other end. It is of course well known that when the waveguide is buried in the lithium niobate, the optical guided wave velocity is lower than what it is when the optical guide is at the surface, and this has to be taken into account when designing the modulator.

One method of fabricating a centrally-located optical waveguide 3' is to divide the dielectric into two slabs of approximately equal thickness, a/2, about half the total desired thickness, a. On one surface of a first dielectric slab 1' the thin optical waveguide 3' is formed (e.g. by indiffusion of titanium) and a second dielectric slab 1" is bonded to the outer surface of the optical waveguide 3'.

Matching the velocity of the electrical signal in the dielectric slabs 1, 1', 1" to the velocity of the optical signal in the waveguide 3, 3' as closely as possible over the desired frequency band by selection of slab thickness is essential in the practice of this invention.

Referring now to the theoretical curve of FIG. 3, if the dielectric slab is very thick the power is mainly confined to the dielectric slab, and the millimeter-wave phase velocity depends only on the dielectric constant of the material As the slab thickness is reduced, the power becomes less confined within the waveguide and the phase velocity increases monotonically toward the free space velocity of light. The curve of FIG. 3 was confirmed by the experiments described below.

Several thin dielectric slabs 1 of different thickness were fabricated to demonstrate experimentally the dependence of the phase velocity of the millimeter-wave signal on slab thickness. A diamond saw and optical polishing equipment were used to fabricate lithium niobate z-cut slabs 3 millimeters wide and 2.5 centimeters long, with various thicknesses in the range of 0.2 to 0.3 millimeter.

Referring to FIG. 1, each slab 1, with slightly tapered ends, was inserted into the ends of metal waveguides 2 of standard size WR-10 (Electronic Industries$ Association designation) typically used in the frequency range of 75 to 110 gigahertz. The millimeter-wave signal 8 was supplied by a 10 milliwatt klystron operating at 94 gigahertz to provide the millimeter-wave input with TM polarization.

An electric field probe was used to measure the electric field as the probe was moved along the surface of the lithium niobate slab 1 in the direction of the propagating millimeter wave 8. The standing waves were easy to detect for the thinner, 0.2 millimeter waveguides since the evanescent fields were strong and the wavelengths were large. The standing waves were more difficult to detect, though still discernible, for the thicker 0.3 millimeter, slabs. The corresponding wavelength and phase velocity were calculated from electric field measurements on six lithium niobate slabs. The experimental results in FIG. 3 show good agreement with the theoretical curve of phase velocity of electric signal versus slab thickness.

The average atmospheric absorption of millimeter waves peaks at about 60 and 120 gigahertz. Within this range, a minimum in attenuation occurs at about 94 gigahertz, which is a commonly preferred communication frequency for propagation through the atmosphere. Another minimum in attenuation occurs at about 150 gigahertz.

The optical modulator of the present invention can be designed for operation at other center frequencies than the 94 gigahertz used in the previous example At low frequency (e.g. less than 1 gigahertz) there is less advantage relative to conventional metal stripline modulators, which can have a large operational bandwidth. The optical modulator of the present invention is most advantageous at high frequencies. In particular, using the equations developed herein, the modulator can be designed for operation at higher frequencies than the 94 gigahertz of the example above For a preferred configuration with the optical waveguide at the surface of the dielectric slab, the performance of the modulator is better at higher center frequencies. From consideration of FIG. 3 and FIG. 4 it can be seen that at center frequencies above 94 gigahertz, the dielectric slab is thinner than 0.25 millimeter to achieve matching velocities. Also, as the dielectric slab is made thinner, the electric field at the center increases and the electric field at the surface also increases, as Table 6 indicates. A greater phase shift $\Delta\phi$ can be obtained for optical waveguides located near the surface as the design frequency is increased above 94 gigahertz.

TABLE 6

| Center Frequency, gigahertz | Dielectric Slab Thickness, millimeters | Electric Field, volts/meter | |
|---|---|---|---|
| | | at Center | at Surface |
| 80 | .3 | 5650 | 420 |
| 94 | 0.25 | 6100 | 460 |
| 110 | 0.21 | 6600 | 490 |

For thick dielectric waveguides, most of the electrical power is confined to the waveguide. As the waveguide is made thinner, more of the electrical power is carried by the evanescent electric field outside the dielectric waveguide.

As shown in FIG. 5, for a thin dielectric waveguide, the electric field is not zero at the boundaries of the thickness of the slab and there is a significant evanescent electric field in the air at the dielectric boundary. Thus, the optical waveguide 3 of FIG. 2 need only be in close proximity to the dielectric waveguide 1 and may be separated by a finite space. However, in a preferred embodiment of this invention where the electrical waveguide and the optical waveguide use the same material, typically lithium niobate, fabrication of the optical waveguide is simpler.

A preferred embodiment of the invention, as shown in FIG. 1, with the optical waveguide at the surface has the advantage of utilizing known fabrication techniques based on diffusion of titanium into the surface of lithium niobate. This embodiment of the invention can be described as an integrated optical modulator. However, the invention is not limited to using the same dielectric material for both the electric waveguide and the optical waveguide. Optical modulators according to the present invention are made with the optical waveguide adjacent to the electrical waveguide, but they need not be in physical contact. If the optical waveguide is sufficiently close to the surface of the dielectric slab waveguide propagating the millimeter wave signal the electric field will overlap the optical field and modulate the optical signal through the electrooptic effect.

For example, the optical waveguide may comprise an optical fiber of electrooptic material such as lithium niobate, and the optical fiber can be extended along the dielectric slab in the lengthwise direction and close to the surface of the slab. In this case the dielectric slab waveguide in which the electrical signal is propagating need not be an electrooptic material.

Figure 6:
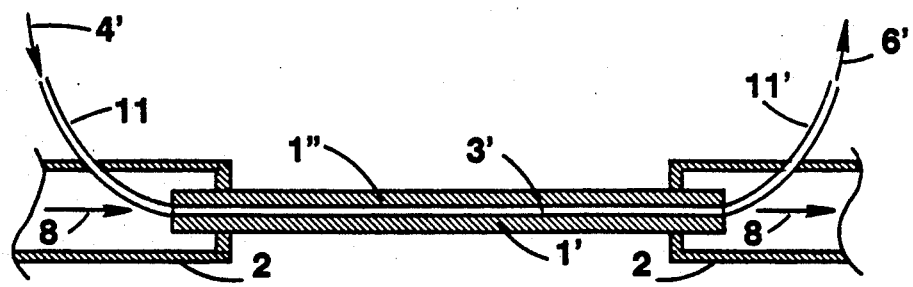
FIG. 6 is a schematic longitudinal sectional view of another typical optical modulator according to the present invention having the optical waveguide at the center of the dielectric slab.

Various methods of directing the laser beam 4,6 to and from the optical waveguide can be used. For example, optical fibers 11 can be used as illustrated in FIG. 6 for a centrally located optical waveguide 3'. For an optical waveguide 3 located at a surface of the dielectric waveguide 1, two rutile prisms could be used for coupling and decoupling the laser beam 4,6 instead of the gratings 5,7 shown in FIGS. 1 and 2. The use of gratings is preferred for compact and rugged design and less effect on the propagation than with prisms. Suitable gratings 5,7 can be formed on the surface of the optical waveguide by depositing a thin layer of material of higher index of refraction, such as arsenic trisulfide, $As_2S_3$, (n=2.5) on lithium niobate (n=2.2); and by selective removal of surface material to leave gratings of spacing appropriate for the wavelength of the laser beam 4. The efficiency of coupling the millimeter waves into and out of the dielectric crystal has not been addressed. It is well known that a variety of tuning stubs irises antireflection coatings, and other devices can be used to maximize the coupling efficiency.

References (1) Alferness R.C., Korotoky, S.K. and Marcatili, E.A.J., "Velocity-Matching Techniques for Integrated Optic Traveling Wave Switch/Modulators", IEEE Journal of Quantum Electronics, Vol. QE-20, No. 3, 301–309, March, 1984.

(2) Ridgway R.W.; Wood, V.E.; Seiler, M.R.; Ruck, G.T.; Whitacre, R.T.; and Busch, J.R.; "Integrated-Optic Modulator Operating at Millimeter-Wave Frequencies"; Integrated and Guided-Wave Optics Topical Meeting; Houston Texas; 1989 Technical Digest Series; Volume 4; Feb. 6–8, 1989.

(3) Applied Nonlinear Optics Frits Zernike and John E. Midwinter, John Wiley & Sons (1973), p. 12.

(4) Klein, Marvin B., "Dielectric Wave-Guide Phase Shifters at 95 GHz Using the Electro-Optic Effect in $LiNbO^{3}$", Ferroelectrics, 1983 Vol. 50 pp. 307–312.

While the forms of the invention herein disclosed constitute presently preferred embodiments, many others are possible. It is not intended herein to mention all of the equivalent forms or ramifications of the invention. It is to be understood that the terms used herein are merely descriptive rather than limiting, and that various changes may be made without departing from the spirit or scope of the invention.

What is claimed is:

1. Apparatus for modulation of optical signals at millimeter-wave frequencies comprising a thin elongate slab of dielectric material having such thickness as to partially confine, and propagate as a guided wave therein, a polarized electrical signal at millimeter-wave frequencies, a thinner optical waveguide to substantially confine and guide therein an optical signal, having at least one elongate surface adjacent to an elongate surface of the dielectric slab, means for directing a polarized optical signal into the optical waveguide to propagate in a lengthwise direction therein, means for directing the optical signal out of the topical waveguide after it has traversed a predetermined distance therein, and means for directing an electrical signal into the dielectric slab in the same direction as that of the optical signal in the optical waveguide, and at a center frequency such that it propagates at a phase velocity substantially matching the phase velocity of the optical signal;

the apparatus being free of electrically conductive material in the proximity of the dielectric slab and the optical waveguide in the region thereof that is traversed by the optical signal, thereby providing efficient electrooptic modulation.

2. Apparatus as in claim 1, wherein an elongate surface of the optical waveguide contacts the adjacent surface of the dielectric slab.

3. Apparatus as in claim 1, wherein the means for directing the electrical signal into the dielectric slab comprises a metallic waveguide.

4. Apparatus as in claim 1, wherein the polarization of the electrical signal is transverse magnetic and the polarization of the optical signal is transverse magnetic.

5. Apparatus as in claim 1, wherein the optical waveguide comprises lithium niobate with titanium diffused therein.

6. Apparatus as in claim 5, wherein the optical signal is in the visible wavelength range for the thickness of the waveguide layer is about 0.5 to 3.0 micrometer.

7. Apparatus as in claim 1, wherein the dielectric slab comprises lithium niobate.

8. Apparatus as in claim 7, wherein the thickness of the dielectric slab is about 0.1 to 0.5 millimeter.

9. Apparatus as in claim 7, wherein the thickness of the dielectric slab is about 0.25 millimeter and the center frequency of the electrical signal is about 94 gigahertz.

10. Apparatus as in claim 1, wherein the means for directing the optical signal into the waveguide comprises an optical grating.

11. Apparatus as in claim 10, wherein the means for directing the optical signal away from the waveguide comprises an optical grating.

12. Apparatus as in claim 11, wherein each grating comprises arsenic trisulfide.

13. Apparatus as in claim 1, wherein the dielectric slab comprises a pair of substantially identical members adjacent to the optical waveguide along opposite elongate surfaces of the waveguide.

14. Apparatus as in claim 13, wherein the means for directing the electrical signal into the dielectric slab comprises a metallic waveguide.

15. Apparatus as in claim 14, wherein the means for directing the optical signal into the waveguide comprises an optical fiber.

16. Apparatus as in claim 15, wherein the means for directing the optical signal away from the waveguide comprises an optical fiber.

17. Apparatus as in claim 16, wherein each optical fiber comprises lithium niobate.

* * * * *

UNITED STATES PATENT AND TRADEMARK OFFICE
CERTIFICATE OF CORRECTION

PATENT NO. : 5,015,052

DATED : May 14, 1991

INVENTOR(S) : Ricahard W. Rideway, Milton R. Seiler, Van E. Wood and George T. Ruck Page 1 of 2

It is certified that error appears in the above-identified patent and that said Letters Patent is hereby corrected as shown below:

Column 3 line 36 delete "$= Be^{-\alpha_2 Z} e^{-j\beta y}$" and insert ---$= Be^{-\alpha_z Z} e^{-j\beta y}$---

Column 3 line 37 delete "$= Be^{\alpha_2 Z} e^{-j\beta y}$" and insert ---$= Be^{\alpha_z Z} e^{-j\beta y}$---

Column 3 line 51 delete "$= \frac{B\beta}{\omega\epsilon_o} e^{-\alpha 2 Z} e^{-j\beta y}$" and insert ---$= \frac{B\beta}{\omega\epsilon_o} e^{-\alpha_z Z} e^{-j\beta y}$---

UNITED STATES PATENT AND TRADEMARK OFFICE
CERTIFICATE OF CORRECTION

PATENT NO. : 5,015,052

DATED : May 14, 1991

INVENTOR(S) : Richard W. Ridgeway, Milton R. Seiler, Van E. Wood and George T. Ruck It is certified that error appears in the above-identified patent and that said Letters Patent is hereby corrected as shown below:

Column 3 line 54 delete "$= \frac{B\beta}{\omega\epsilon_o} e^{\alpha 2 z} e^{-j\beta y}$" and insert $--= \frac{B\beta}{\omega\epsilon_o} e^{\alpha_z z} e^{-j\beta y}--$ Column 4 line 20 delete "$\alpha_z^2 = \beta^2 - \psi^2 \epsilon_o \mu_o$" and insert $--\alpha_z^2 = \beta^2 - \omega^2 \epsilon_o \mu_o--$ Column 13 line 4 delete "14," and insert --13,--

Signed and Sealed this

First Day of June, 1993

Attest:

MICHAEL K. KIRK

*Attesting Officer*     Acting Commissioner of Patents and Trademarks